No. 833,345. PATENTED OCT. 16, 1906.
H. N. SHAMBOUGH.
TARGET TRAP.
APPLICATION FILED AUG. 4, 1905.

WITNESSES:
D. Webster, Jr.
R. M. Kelly.

INVENTOR
Howard N. Shambough,
BY
Attorney

No. 833,345. PATENTED OCT. 16, 1906.
H. N. SHAMBOUGH.
TARGET TRAP.
APPLICATION FILED AUG. 4, 1905.

WITNESSES:
D. Webster, Jr.
C. M. Kelly

INVENTOR
Howard N. Shambough
BY
Attorney

No. 833,345. PATENTED OCT. 16, 1906.
H. N. SHAMBOUGH.
TARGET TRAP.
APPLICATION FILED AUG. 4, 1905.

No. 833,345. PATENTED OCT. 16, 1906.
H. N. SHAMBOUGH.
TARGET TRAP.
APPLICATION FILED AUG. 4, 1905.

WITNESSES:
D. Webster, Jr.
R. M. Kelly

INVENTOR
Howard N. Shambough
By
Attorney

UNITED STATES PATENT OFFICE.

HOWARD N. SHAMBOUGH, OF NORRISTOWN, PENNSYLVANIA.

TARGET-TRAP.

No. 833,345.  Specification of Letters Patent.  Patented Oct. 16, 1906.

Application filed August 4, 1905. Serial No. 272,636.

*To all whom it may concern:*

Be it known that I, HOWARD N. SHAMBOUGH, of Norristown, county of Montgomery, and State of Pennsylvania, have invented an Improvement in Target-Traps, of which the following is a specification.

Heretofore target-traps have usually been actuated by a spring or equivalent means to impart the rotary movement to the throwing-arm which ejects the target.

It is the object of my present invention to operate the throwing-arm by a pressure-motor or small engine, whereby much greater power and more uniform operation may be obtained.

The operation of the pressure-motor or engine may be controlled at will and on each operation will impart the necessary movement to the throwing-arm, after which the engine and parts operated by it will come to a state of rest. Thus while the motive power is supplied by the engine or motor the control is wholly under the will of the trap operator, and the trap may be sprung in substantially the same manner and with the same facility as an ordinary spring-trap.

While I have shown a gas-engine as the pressure-motor for operating the trap and prefer that device, I do not mean to limit my invention to this particular form, as other engines or pressure-motors may be used for the purpose.

In carrying out my invention with a gas-engine, as shown in the drawings, the rotary throwing-arm is connected with the engine-piston and is locked in loading position by a catch device. This catch device, as well as the firing-pins of the engine and the engine-exhaust, is operated by a lever controlled at will by the trap operator, and when this lever is pulled the exhaust is closed, the catch released, and the firing-pins actuated to explode the gas and project the piston. The lever when released returns immediately to its normal position and the exhaust-valve, firing-pins, and catch mechanism are returned to the former positions by means independent of the control of the actuating-lever.

Owing to the momentum of the throwing-arm, it is desirable that it should be allowed to slow down before it is arrested in order that the jar that would otherwise result may be avoided. I prefer, therefore, to arrange the catch-resetting device to arrest the arm after it has made two complete revolutions.

In the drawings, Fig. 3 is a plan view.

$a$ is the throwing-arm, which may be of any suitable construction. I have shown a well-known form having spring target-jaws $a'$ $a^2$ pivoted together, the former being pivoted by the tension wrist-pin $a^3$ to the outer end of the arm $a$ and connected by a spring $a^4$ with the inner end of the arm. Other forms may be used, if desired.

The inner end of the arm $a$ carries a pin $a^5$, pivoted in bearing $b'$ on the motor-cylinder $b$, which is suitably supported by the stationary base-piece $c$, preferably on a pivot-stud $c'$, by means of which its horizontal angular position may be varied.

As shown, the cylinder $b$ is connected with the pivot $c'$ by a cheek-piece $c^2$, having a curved slot $c^3$ and a screw $c^4$, by means of which the angular elevation of the cylinder $b$ and the throwing-arm may be adjusted. The supporting-pivot $c'$ may be connected by an arm or connection $d'$ with the loader's seat $d$, so that by shifting the position of the seat the horizontal angular position of the cylinder and throwing-arm may be varied to change the flight of the targets when ejected. Within the cylinder $b$ is a piston $e$, having its piston-rod $e'$ connected by a crank $e^2$ with the pivot-pin $a^5$, so that the projection of the piston will impart a rotary movement to the pivot-pin $a^5$ and the throwing-arm $a$, carried thereby.

Figure 7:
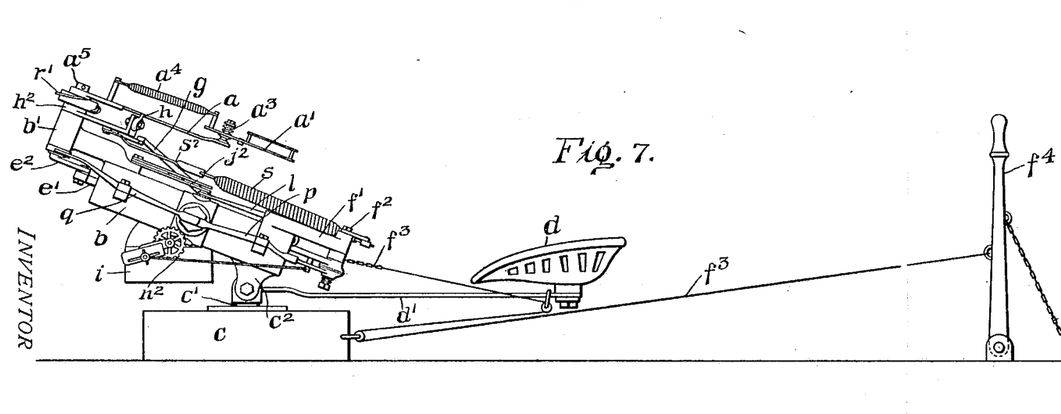
Fig. 7 is a side elevation of the trap, on a reduced scale, showing its connection with the loader's seat and the operating-lever.

On a bracket $f'$, carried by the rear end of the cylinder $b$, is a stud $f^2$, having the operating-lever $f$ connected with the pull-cord $f^3$, which may be operated from a distance by a lever $f^4$. (See Fig. 7.) Carried by the lever $f$ is a lug $g'$, which engages a laterally-swinging cam-dog $g^2$ on one end of a lever $g$, pivoted at $g^3$ to the cylinder $b$ and having its other end provided with a finger $g^4$, which engages a projection $h^4$ of a pivoted catch $h$, carried on a pin $h'$, journaled in a bracket $h^2$, carried by the bearing $b'$. On the inner end of the pin $h'$ is a finger $h^3$, which engages a spiral cam $r$, carried by the pivot-pin $a^5$ and rotating with it.

Figure 2:
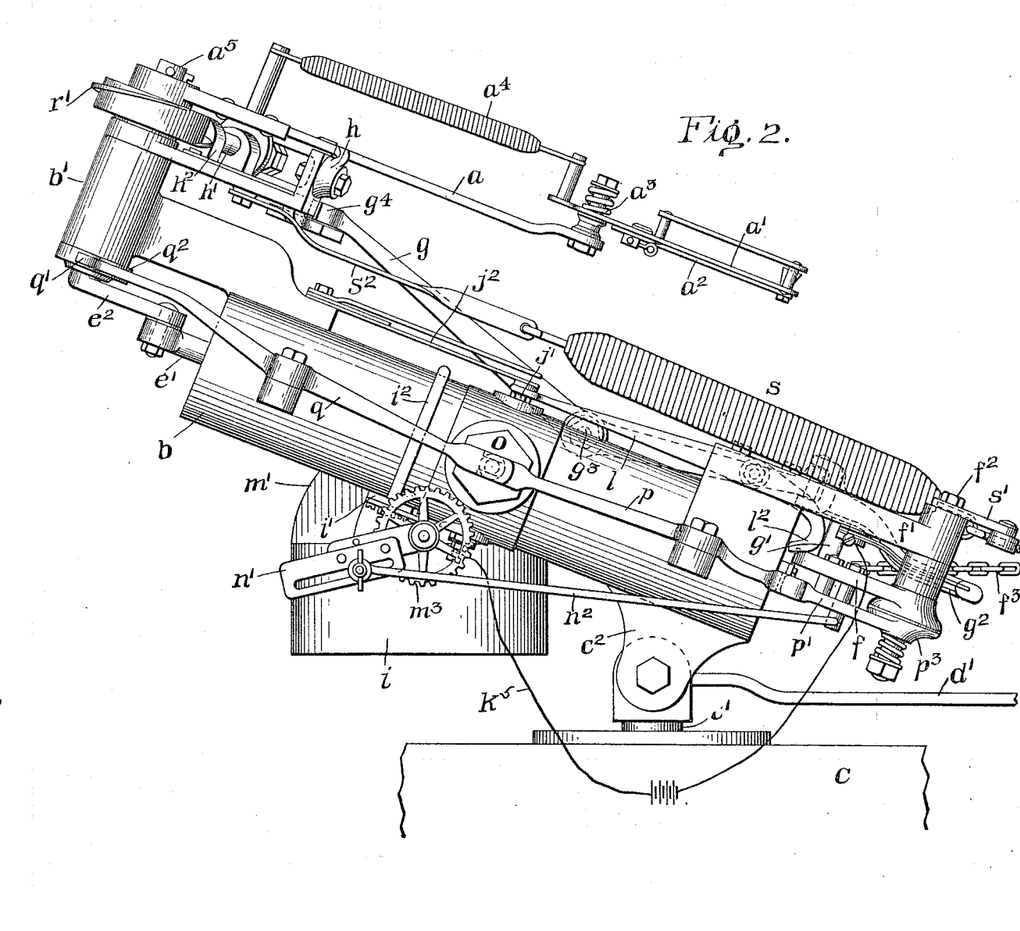
Fig. 2 is a similar view looking from the other side.

The catch $h$ when elevated engages the throwing-arm $a$ and prevents it from rotating. (See Fig. 2.) When the lever $f$ is rocked, the lug $g'$, acting on the cam-dog $g^2$, elevates the outer end of the lever $g$ and depresses the finger $g^4$, which, acting on the catch $h$, moves it out of engagement with the arm $a$. (See Fig. 5.) The cam-dog $g^2$ is connected with the lever $g$ on a vertical pivot $g^5$ to permit lateral movement when the lug $g'$ passes under it. The frame of the catch $h$ is preferably connected with its pin $h'$ by a tension-spring $h^5$ instead of rigidly, and the tension of this spring $h^5$ will maintain the arm $h^3$ in position to be acted upon by the cam $r$, as is more fully described hereinafter.

$j$ $j'$ are sparking points or firing-pins in the cylinder $b$ behind the piston $e$, by means of which the gas admitted to the cylinder is exploded. While I do not limit my invention to any particular devices for creating the explosion, I have shown, and claim as part of my improvements, certain devices for this purpose. The pin $j$ is fixed, while the pin $j'$ is movable, being normally pressed in contact with the pin $j$ by a spring $j^2$, acting on the projecting end of the pin outside of the cylinder.

In the back of the cylinder is a piston $k$, having a piston-rod $k'$ pivotally connected with it at $k^2$, and said rod $k'$ is pivoted, as at $k^4$, to the lever $f$. The movable pin $j'$ is engaged by one arm of a lever $l$, pivoted, as at $l'$, on the outside of the cylinder $b$ and having at its outer end a trigger $l^2$, which is arranged to be acted upon by a cam-face $k^3$ on the piston $k$, so that when the piston is retracted by the lever $f$ the lever $l$ will be rocked to raise its outer end and move the pin $j'$ against the action of the spring $j^2$ away from the pin $j$. (See Fig. 4.) The pins $j$ $j'$ are shown in a suitable electric circuit $k^5$, so that when thus moved apart they will produce a spark to ignite the gas in the cylinder.

Figure 6:
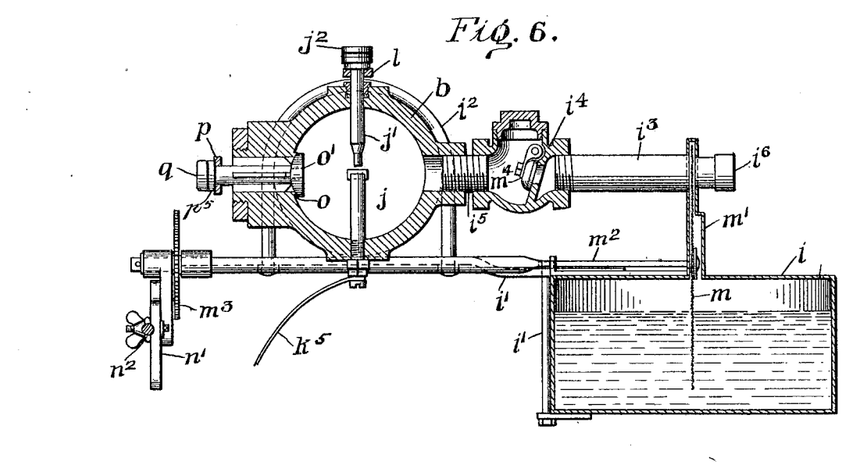
Fig. 6 is a transverse section on the line A A of Fig. 5.

$i$ is a small tank for gasolene or equivalent volatile fluid having an explosive gas, which may be carried by a suitable frame $i'$, supported by the cylinder, as by a yoke $i^2$. (See Fig. 6.) The gas is conducted from this tank through suitable pipe connections $i^3$ $i^4$ $i^5$ into the cylinder $b$. $m^4$ is a check-valve in the gas-supply connections opening toward the cylinder. The gas may pass through this check into the cylinder, and its entry is assisted by the slight suction produced by the movement of the piston $k$.

Figure 1:
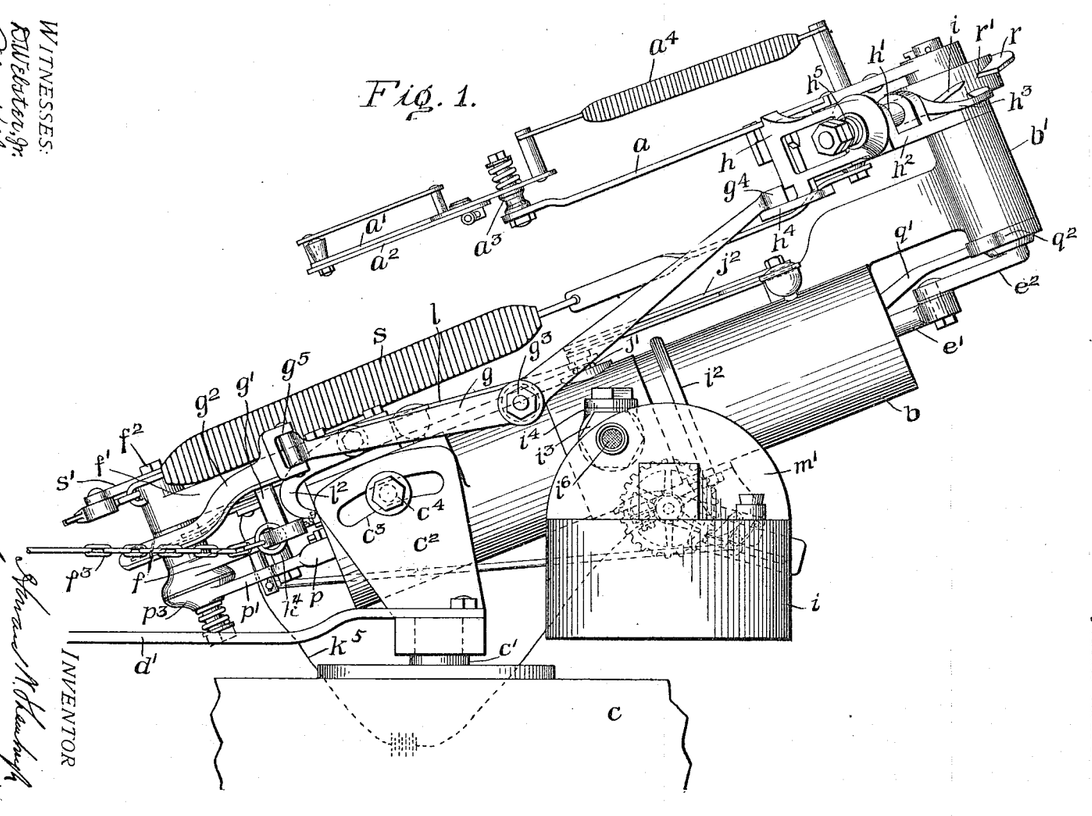
Figure 1 is a side elevation of my motor target-trap looking from one side.

For the purpose of vaporizing the gasolene in the tank $i$ and supplying it to the cylinder I have shown a reticulated rotary disk $m$, preferably of gauze wire, which is partly submerged in the liquid in the tank and extends up through a hollow casing $m'$ into the pipe $i^3$, the outer end of which is provided with an air-inlet $i^6$, Fig. 1. This disk $m$ is rotated by suitable power-transmitting devices. I have shown the disk carried by a shaft $m^2$, journaled in the frame $i'$ and carrying a ratchet $m^3$, operated by a pawl $n$, carried in a slotted frame $n'$, and reciprocated by a rod $n^2$, connected with the lever $f$.

$o$ is the exhaust-port of the cylinder $b$, controlled by a slide valve $o'$, which is connected with one arm of a lever $p$ on the cylinder, the other end of which is connected with a crank-arm $p'$ on the stud $f^2$ of the lever $f$, so that when the lever is pulled by the pull-cord $f^3$ it will rock the lever $p$ and move the valve $o'$ outward to close the exhaust-port. The lever $p$ is loosely connected with the stem of the valve $o'$, as by a fork engaging a head $p^5$ on the outer end of the stem, so that the lever $p$ will move the valve outward to close the exhaust-port, but not inward to open it.

As shown, the crank-arm $p'$ is not connected rigidly with the stud $f^2$, but yieldingly by a frictional tension connection $p^3$. The exhaust-valve $o'$ is opened by a lever $q$, pivoted to the cylinder and having one arm bearing on the stem of the valve $o'$ and the other end $q'$ acted upon by a cam $q^2$ on pivot-pin $a^5$.

$s$ is a spring having one end connected with an arm $s'$ on the stud $f^2$ and having its other end connected, as by a bar $s^2$, with the bracket $h^2$. This spring acts to return the lever $f$ and the operative parts of the trap to normal position of rest after the pull-cord $f^3$ is released.

One or more small open auxiliary exhaust-ports $t$ may be used in the cylinder in the rear of the piston $e$ in position to be opened to the interior of the cylinder on the inner side of the piston at the end of its forward stroke.

Figures 4, 5:
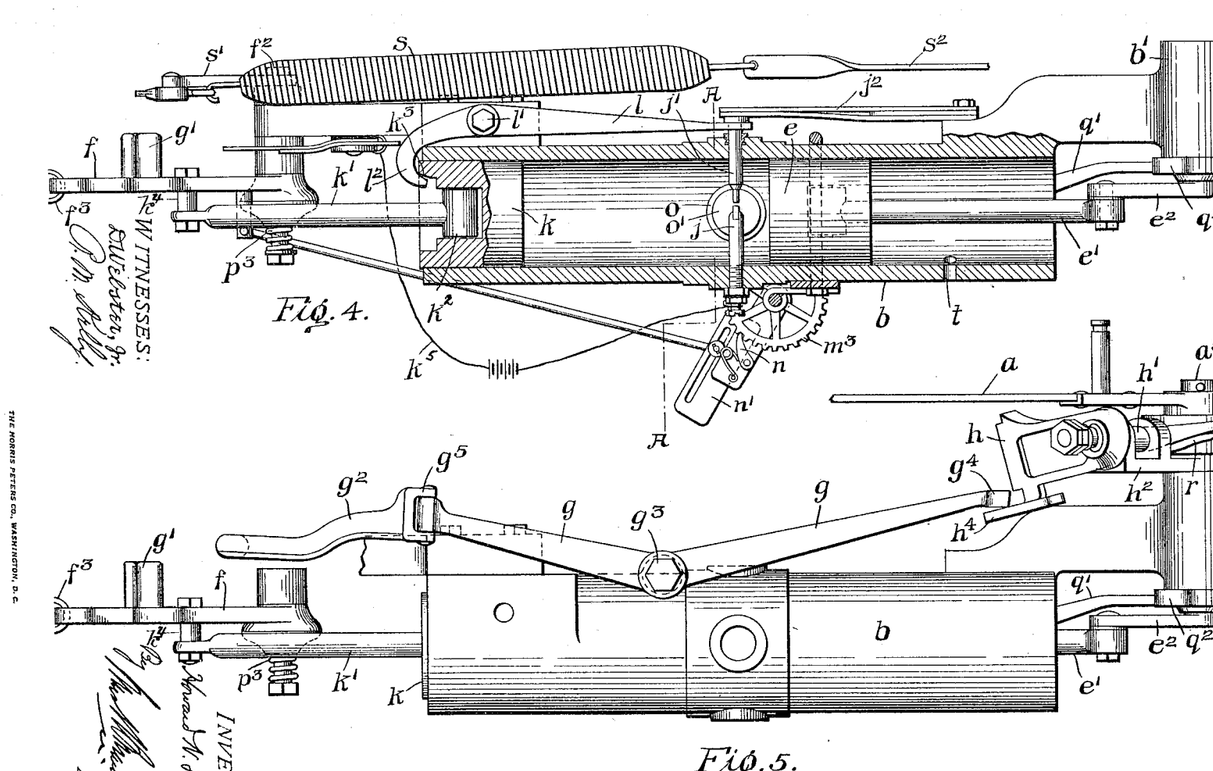
Fig. 4 is a side elevation of the motor-cylinder and mechanism for arresting the throwing-arm, illustrating the operation thereof.
Fig. 5 is a longitudinal vertical section of the motor-cylinder with its connections, the latter being shown in elevation.
Figure 5:
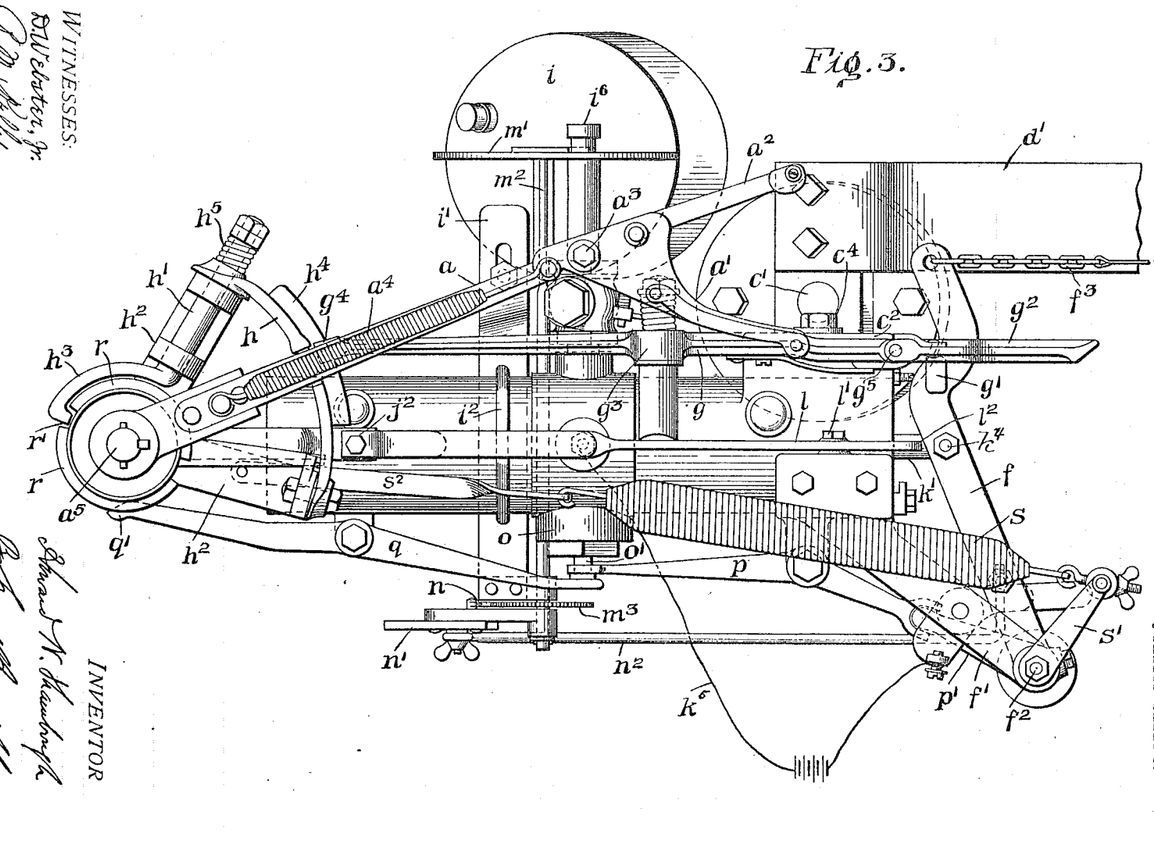

The operation of the trap is as follows: When the trap is in a normal state of rest, as shown in Figs. 1, 3, and 4, the lever $f$ is pulled inward by the spring $s$. The pistons $e$ and $k$ are in their forward positions, and the exhaust-port $o$ is open. The throwing-arm is in retracted position and is locked by the catch $h$. The loader on the seat $d$ places the target in the jaws $a'$ $a^2$, and the trap is ready to be sprung. This is effected by pulling back the lever $f$, which acts on the lever $g$ through the lug $g'$ and cam-dog $g^2$ to depress the catch $h$ and release the throwing-arm $a$. At the same time the arm $p'$ acts on the lever $p$ and closes the exhaust-port $o$. The lever $f$ also retracts the piston $k$, which, acting through the cam-face $k^3$ on the finger $l^2$, actuates the lever $l$ to move the sparking point $j$ and produce the spark in the cylinder $b$ to explode the gas which has been drawn in, and thereby project the piston $e$. The piston $e$ when thus projected rotates the pivot-stud $a^5$ and the throwing-arm $a$, carried thereby. When the piston $e$ reaches the end of its forward movement under the impulse of the explosion, the cam $q^2$ on the pivot-pin $a^5$, acting on the lever $q$, presses in the valve $o'$ and opens the exhaust-port $o$, and thus relieves the pressure and allows the piston $e$ to return under its momentum, thus completing the revolution of the throwing-arm. To effect this result, the pressure in the cylinder should be relieved as soon as the piston completes its forward stroke, and therefore the auxiliary ports $t$ are provided, as they will commence to exhaust as soon as the piston has opened them. The larger exhaust $o$, which is controlled by the valve $o'$, may therefore remain closed until the completion of the forward stroke without impeding the return of the piston.

Owing to the high speed at which the throwing-arm rotates under the action of the motor, it is desirable that it should be allowed to slow down before it is arrested, and therefore it is allowed to complete two full revolutions before it is brought to rest. This is effected by the spiral cam $r$, which is carried by the pivot-pin $a^5$ and rotates with it. This cam is in the form of a spiral pin having a notch or opening $r'$ on one side. When the catch $h$ is elevated and the parts are at rest, as in Fig. 1, the finger $h^3$ of the catch is in the lowest position below the cam and adjacent to the notch. When the catch $h$ is depressed by the lever $g$, this finger $h^3$ is lifted through the notch $r'$ to a position above the cam, and as the cam rotates it will pass under the finger until the highest part of the cam is reached, when it will pass over the finger, and as the cam continues to rotate and its lowest portion acts on the finger it will depress it and raise the frame $h$ in position to engage the arm $a$, at the same time rocking the lever $g$ and restoring it to its former position. The tension afforded by the spring $h^5$ counteracts the weight of the catch-frame $h$ and maintains the finger $h^3$ in elevated position until it is positively depressed by the lowest portion of the cam $r$, and as that lower portion will not act to depress the finger $h^3$ until after the cam $r$ and the arm $a$ has completed its revolution it results that said arm will make two revolutions under the momentum imparted by the motor before it is arrested by the catch $h$ in position for reloading.

After the lever $f$ is actuated it may be immediately released, and its return by the spring $s$ will have no effect upon the operation of the parts. The loose connection of the lever $p$ with the stem of the valve $o'$ will permit the lever to move inward without opening the valve, which will remain closed until it is positively opened by the cam $q^2$ and lever $q$. The return of the piston $k$ will release the trigger $l^2$ of the lever $l$ and permit the sparking pin $j'$ to be moved back by the spring $j^2$. Each forward movement of the lever $f$ also actuates the vaporizing-disk $m$, through the rod $n^2$, pawl $n$, ratchet $m^3$, and shaft $m^2$, to carry particles of gasolene into the vaporizing-tube $i^3$.

What I claim as new, and desire to secure by Letters Patent, is as follows:

1. In a target-trap, the combination with the throwing-arm, of a pressure-motor operatively connected therewith and adapted when operated to actuate said throwing-arm said pressure-motor being the means of actuating the arm in throwing the target.

2. In a target-trap, the combination with the throwing-arm, of a pressure-motor operatively connected therewith and adapted when operated to actuate said throwing-arm said pressure-motor being the means of actuating the arm in throwing the target, and means controlled at will to operate said pressure-motor.

3. In a target-trap, the combination with the throwing-arm, of a gas-engine operatively connected therewith and adapted when operated to actuate said throwing-arm said gas-engine being the means of actuating the arm in throwing the target.

4. In a target-trap, the combination with the throwing-arm, of a motor-cylinder, and its piston, said piston being operatively connected with the throwing-arm and adapted when operated to actuate it and being the means of actuating the arm in throwing the target.

5. In a target-trap, the combination with the throwing-arm, of a motor-cylinder, and its piston, said piston being operatively connected with the throwing-arm and adapted when operated to actuate it and being the means of actuating the arm in throwing the target, and means controlled at will for actuating said piston.

6. In a target-trap, the combination with the throwing-arm, of a gas-engine operatively connected therewith and adapted when operated to actuate said throwing-arm said gas-engine being the means of actuating the arm in throwing the target, means to produce an explosion in said engine, and means controlled at will to actuate said means for producing the explosion.

7. In a target-trap, the combination with the throwing-arm, of a pressure-motor operatively connected therewith and adapted when operated to actuate said throwing-arm said motor being the means of actuating the arm in throwing the target, means controlled at will to operate said pressure-motor, and means to restore said motor-operating means to normal position after they have been actuated.

8. In a target-trap, the combination of a rotary throwing-arm, a catch to retain said throwing-arm against movement, a pressure-motor operatively connected with said throwing-arm and adapted when operated to rotate it, said motor being the means of actuating the arm in throwing the target, means to control the operation of said pressure-motor, and operative connections between said means to control the operation of the motor and the catch to release the throwing-arm when the motor is actuated.

9. In a target-trap, the combination of a rotary throwing-arm, a catch to retain said throwing-arm against movement, a pressure-motor operatively connected with said throwing-arm and adapted when operated to rotate it, means to control the operation of said pressure-motor, operative connections between said means to control the operation of the motor and the catch to release the throwing-arm when the motor is actuated, and a catch-controller to restore said catch to position to arrest the arm after a given extent of revolution.

10. In a target-trap, the combination of a rotary throwing-arm, a catch to retain said throwing-arm against movement, a pressure-motor operatively connected with said throwing-arm and adapted when operated to rotate it, means to control the operation of said pressure-motor, operative connections between said means to control the operation of the motor and the catch to release the throwing-arm when the motor is actuated, and a catch-controller controlled by the rotation of the throwing-arm to restore said catch to position to arrest the arm after a given extent of revolution.

11. In a target-trap, the combination of a rotary throwing-arm, a catch to retain said throwing-arm against movement, a pressure-motor operatively connected with said throwing-arm and adapted when operated to rotate it, means to control the operation of said pressure-motor, and a lever controlled by the motor-controlling means and acting on the catch to move it out of engagement with the throwing-arm when said motor-controlling means are operated.

12. In a target-trap, the combination with a pressure-motor-actuated throwing-arm, of a pivoted catch adapted to hold said arm against movement, a motor-controlling lever, and a catch-controlling lever actuated by said motor-controlling lever to release the catch.

13. In a target-trap, the combination with a pressure-motor-actuated throwing-arm, of a pivoted catch adapted to hold said arm against movement, a motor-controlling lever, a catch-controlling lever actuated by said motor-controlling lever to release the catch, and means independent of said catch-controlling lever to restore the catch after a given revolution of the throwing-arm.

14. In a target-trap, the combination with a pressure-motor-actuated throwing-arm, of a pivoted catch adapted to hold said arm against movement, a motor-controlling lever, a catch-controlling lever actuated by said motor-controlling lever to release the catch, and means independent of said catch-controlling lever to restore the catch after a given revolution of the throwing-arm, consisting of a cam carried with the throwing-arm and rotating therewith and a finger carried by the catch and actuated by said cam.

15. In a target-trap, the combination with a pressure-motor-actuated pivoted throwing-arm, a catch adapted to hold said arm against rotation, means to control the operation of the pressure-motor, catch-releasing devices controlled by said means to control the operation of the pressure-motor, and means independent of said catch-releasing devices to restore the catch after a given revolution of the throwing-arm.

16. In a target-trap, the combination with a pressure-motor-actuated pivoted throwing-arm, a catch adapted to hold said arm against rotation, means to control the operation of the pressure-motor, catch-releasing devices controlled by said means to control the operation of the pressure-motor, and means independent of said catch-releasing devices to restore the catch after a given revolution of the throwing-arm, consisting of a spiral cam carried by the pivoted throwing-arm and a finger carried by the catch and actuated by said spiral cam.

17. In a target-trap, the combination with a rotary throwing-arm, of a gas-engine operatively connected therewith and adapted when operated to actuate said throwing-arm, means controlled at will to produce an explosion in said engine, and means operatively connected with said means for controlling the explosion to control the exhaust from said engine.

18. In a target-trap, the combination with a rotary throwing-arm of a gas-engine operatively connected therewith and adapted when operated to actuate said throwing-arm, means controlled at will to produce an explosion in said engine, and means operatively connected with said means for controlling the explosion to close the exhaust from said engine.

19. In a target-trap, the combination with a rotary throwing-arm of a gas-engine operatively connected therewith and adapted when operated to actuate said throwing-arm, means controlled at will to produce an explosion in said engine, means operatively connected with said means for controlling the explosion to close the exhaust from said engine, and means independent of said exhaust-closing means controlled by the throwing-arm to open said exhaust.

20. In a target-trap, the combination with a rotary throwing-arm, a fluid-pressure motor operatively connected therewith, and adapted when operated to actuate said throwing-arm, means to control the operation of said fluid-pressure motor, a valve for controlling the exhaust from the motor-chamber of said motor, devices controlled by the means to control the operation of the fluid-pressure to move the exhaust-valve in one direction, and devices controlled by the rotary throwing-arm to move said valve in the other direction.

21. In a target-trap, the combination with a rotary throwing-arm, a fluid-pressure motor operatively connected therewith, and adapted, when operated to actuate said arm, an operating-lever for controlling said fluid-pressure motor, an exhaust-valve from the motor-chamber of said motor, and connections between said operating-lever and exhaust-valve for operating it in one direction.

22. In a target-trap, the combination with a rotary throwing-arm, a fluid-pressure motor operatively connected therewith and adapted when operated to actuate said arm, an operating-lever for controlling said fluid-pressure motor, an exhaust-valve from the motor-chamber of said motor, connections between said operating-lever and exhaust-valve for operating it in one direction, and connections between the throwing-arm and exhaust-valve to move it in the other direction.

23. In a target-trap, the combination with a rotary throwing-arm, of a motor-cylinder supporting said throwing-arm, a piston operatively connected with said throwing-arm and adapted, when operated to actuate it, and means to control the operation of said piston.

24. In a target-trap, the combination of a motor-cylinder pivoted upon an upright axis, a rotary throwing-arm carried by said cylinder, a piston operatively connected with said throwing-arm and adapted when operated to actuate it, and means to control the operation of said piston.

25. In a target-trap, the combination of a motor-cylinder pivoted upon an upright axis, a loader's seat connected with said cylinder, by the movement of which the horizontal angular position of said cylinder may be changed at will, a rotary throwing-arm carried by said cylinder, a piston operatively connected with said throwing-arm and adapted when operated to actuate it, and means to control the operation of said piston.

26. In a target-trap, the combination of a motor-cylinder pivoted upon an upright axis with provision for adjustment in a vertical plane to vary the angular inclination of said cylinder, a rotary throwing-arm carried by said cylinder, a piston operatively connected with said throwing-arm, and adapted when operated to actuate it, and means to control the operation of said piston.

27. In a target-trap, the combination with a rotary throwing-arm, of a motor-cylinder, a piston in said cylinder operatively connected with said throwing-arm, a tank for motor fluid having a supply connection with said cylinder, and means to control the explosion of the gas supplied to the cylinder from said tank.

28. In a target-trap, the combination with a rotary throwing-arm of a motor-cylinder, a piston in said cylinder operatively connected with said throwing-arm, a tank for motor fluid having a supply connection with said cylinder, means for vaporizing the fluid in said tank and supplying it to the cylinder, and means controlled at will to explode the gas supplied to the cylinder by said vaporizing means.

29. In a target-trap, the combination with a rotary throwing-arm, of a motor-cylinder, a piston in said cylinder operatively connected with said throwing-arm, a tank for motor fluid having a supply connection with said cylinder, means for vaporizing the fluid in said tank and supplying it to the cylinder, means controlled at will to explode the gas supplied to the cylinder by said vaporizing means and to operate said means for vaporizing the fluid and supplying it to the cylinder.

30. In a target-trap, the combination with a rotary throwing-arm, of a motor-cylinder a piston in said cylinder operatively connected with said throwing-arm, a tank for motor fluid having a supply connection with said cylinder, a rotary disk partly submerged in said tank and adapted when rotated to convey the liquid to the supply connection, sparking devices in said cylinder, means controlled at will to operate said sparking devices and produce an explosion, and operative connections between said means controlled at will and the vaporizing-disk.

31. In a target-trap, the combination of the motor-cylinder, a rotary throwing-arm, a piston in the cylinder operatively connected with the throwing-arm and adapted to actuate it, sparking devices in said cylinder, and means controlled at will to operate said sparking devices.

32. In a target-trap, the combination of the motor-cylinder, a rotary throwing-arm, a piston in the cylinder operatively connected with the throwing-arm and adapted to actuate it, sparking devices in said cylinder, a movable piston in the rear of said cylinder, means controlled at will to operate said piston, and operative connections between said piston and the sparking devices.

33. In a target-trap, the combination of the motor-cylinder, a rotary throwing-arm, a piston in the cylinder operatively connected with the throwing-arm and adapted to actuate it, sparking devices in said cylinder, and independent means to restore said sparking devices after they have been operated.

34. In a target-trap, the combination of a rotary throwing-arm, a pressure-motor operatively connected with said throwing-arm and adapted when operated to actuate it, an exhaust-valve from said fluid-pressure motor, means controlled at will to close said exhaust-valve and operate the motor, and means independent of said means controlled at will to open the exhaust-valve after the motor has operated.

35. In a target-trap, the combination of a rotary throwing-arm, a gas-engine having its piston operatively connected with the throwing-arm, igniting devices in said engine, an exhaust-valve from said engine, and means controlled at will to close the exhaust-valve and operate the igniting devices.

36. In a target-trap, the combination of a rotary throwing-arm, a gas-engine having its piston operatively connected with the throwing-arm, igniting devices in said engine, means controlled at will to close the exhaust-valve and operate the igniting devices, and means independent of said means controlled at will to open the exhaust-valve and return the igniting devices after the engine has operated.

In testimony of which invention I hereunto set my hand.

HOWARD N. SHAMBOUGH.

Witnesses:
    HENRY I. FOX,
    J. R. YOST